(12) United States Patent
Lewis-Malone

(10) Patent No.: US 11,051,462 B2
(45) Date of Patent: Jul. 6, 2021

(54) STAIN PROOF GARDENING CONTAINER

(71) Applicant: Beverly Lewis-Malone, North Las Vegas, NV (US)

(72) Inventor: Beverly Lewis-Malone, North Las Vegas, NV (US)

( * ) Notice: Subject to any disclaimer, the term of this patent is extended or adjusted under 35 U.S.C. 154(b) by 345 days.

(21) Appl. No.: 16/221,506

(22) Filed: Dec. 15, 2018

(65) Prior Publication Data

US 2020/0187428 A1    Jun. 18, 2020

(51) Int. Cl.
*A01G 9/02* (2018.01)
*A01G 9/029* (2018.01)
*A01G 27/00* (2006.01)

(52) U.S. Cl.
CPC ......... *A01G 9/0291* (2018.02); *A01G 27/005* (2013.01); *A01G 27/008* (2013.01)

(58) Field of Classification Search
CPC .. A01G 9/0291; A01G 27/005; A01G 27/008; A01G 7/06; A01G 9/245; A01G 22/60; A01G 22/05; A01G 17/02
See application file for complete search history.

(56) References Cited

U.S. PATENT DOCUMENTS

| | | | | |
|---|---|---|---|---|
| 869,523 A | * | 10/1907 | Schmidt | A01G 9/02 47/66.6 |
| 1,487,231 A | * | 3/1924 | George | A01G 9/02 47/39 |
| 1,513,829 A | * | 11/1924 | Klow | A01G 9/02 47/66.1 |
| 1,666,240 A | * | 4/1928 | Hubert | A01G 9/02 47/66.1 |

(Continued)

*Primary Examiner* — Ebony E Evans
(74) *Attorney, Agent, or Firm* — Kimberly McLean, Esq.; McLean Law LLC

(57) ABSTRACT

A stain-proof gardening container having a cap brace including a plurality of grooves, each groove connects to a top edge of one of a corresponding vertically oriented left side panel member, right side panel member and back panel member, a front panel member including a handle, the front panel member attaches to the left side panel member, a floor panel including a well and a plurality of grooves, each groove connects to a bottom edge of one of a corresponding vertically oriented left side panel member, right side panel member and back panel member, a housing frame formed by the cap brace, left side panel member, right side panel member, back panel member, front panel member and floor panel, the housing frame including an interior cavity, a gardening collection receptacle for receiving and storing at least one gardening component, the gardening collection receptacle including an elastic headband located at its top region for installing the gardening collection receptacle in the interior cavity of the housing unit and a drainage aperture located at its bottom region for draining excess materials from the gardening collection receptacle and a drainage collection repository for receiving the excess materials drained from the gardening collection receptacle. The drainage collection repository including a handle for removing the drainage collection repository from the housing unit, and wherein the drainage collection repository is positioned within the well in the floor panel.

10 Claims, 5 Drawing Sheets

(56) References Cited

U.S. PATENT DOCUMENTS

| | | | | |
|---|---|---|---|---|
| 1,808,402 | A * | 6/1931 | Cooper | A01G 9/02 47/39 |
| 1,959,800 | A * | 5/1934 | Rogge | A47G 7/041 47/75 |
| 5,347,751 | A * | 9/1994 | Carpay | A47G 7/041 47/39 |
| 6,209,261 | B1 * | 4/2001 | Marks | A01G 9/02 47/66.1 |
| 6,230,437 | B1 * | 5/2001 | Wolverton | B01D 53/85 47/39 |
| 6,385,899 | B1 * | 5/2002 | Treganza | A47G 7/041 47/39 |
| 8,070,327 | B1 * | 12/2011 | Gallagher | F21V 7/0008 362/310 |
| 9,585,312 | B1 * | 3/2017 | Klinicki | A01G 9/02 |
| 2008/0072835 | A1 * | 3/2008 | Hongtawornsiri | A01G 9/02 119/246 |
| 2012/0174481 | A1 * | 7/2012 | Toro | A01G 9/02 47/86 |
| 2018/0242531 | A1 * | 8/2018 | Berry, III | A01G 27/02 |

\* cited by examiner

STAIN PROOF GARDENING CONTAINER

FIELD OF THE INVENTION

Embodiments described herein generally relate to gardening containers, and more particularly to a stain proof gardening container.

BACKGROUND OF THE INVENTION

Existing plant water collectors sit below the plant container and collect water. Water tends to accumulate in these containers due to overwatering or rainfall. This water eventually tends to spill over, resulting in floor damage and ugly stains that can be difficult to remove. Moreover, this accumulated water over time causes an unpleasant odor and a gardener has to lift the plant from the plant water collector to drain the collected water. The existing plant water collectors do not provide any means of preventing or neutralizing unpleasant odors. Hence, it is desirable to provide a gardening container that is stain proof and prevents unpleasant odors.

BRIEF DESCRIPTION OF THE DRAWINGS

The various advantages of the embodiments of the present disclosure will become apparent to one skilled in the art by reading the following specification and appended claims, and by referencing the following drawings, in which:

SUMMARY OF THE INVENTION

Figure 1:
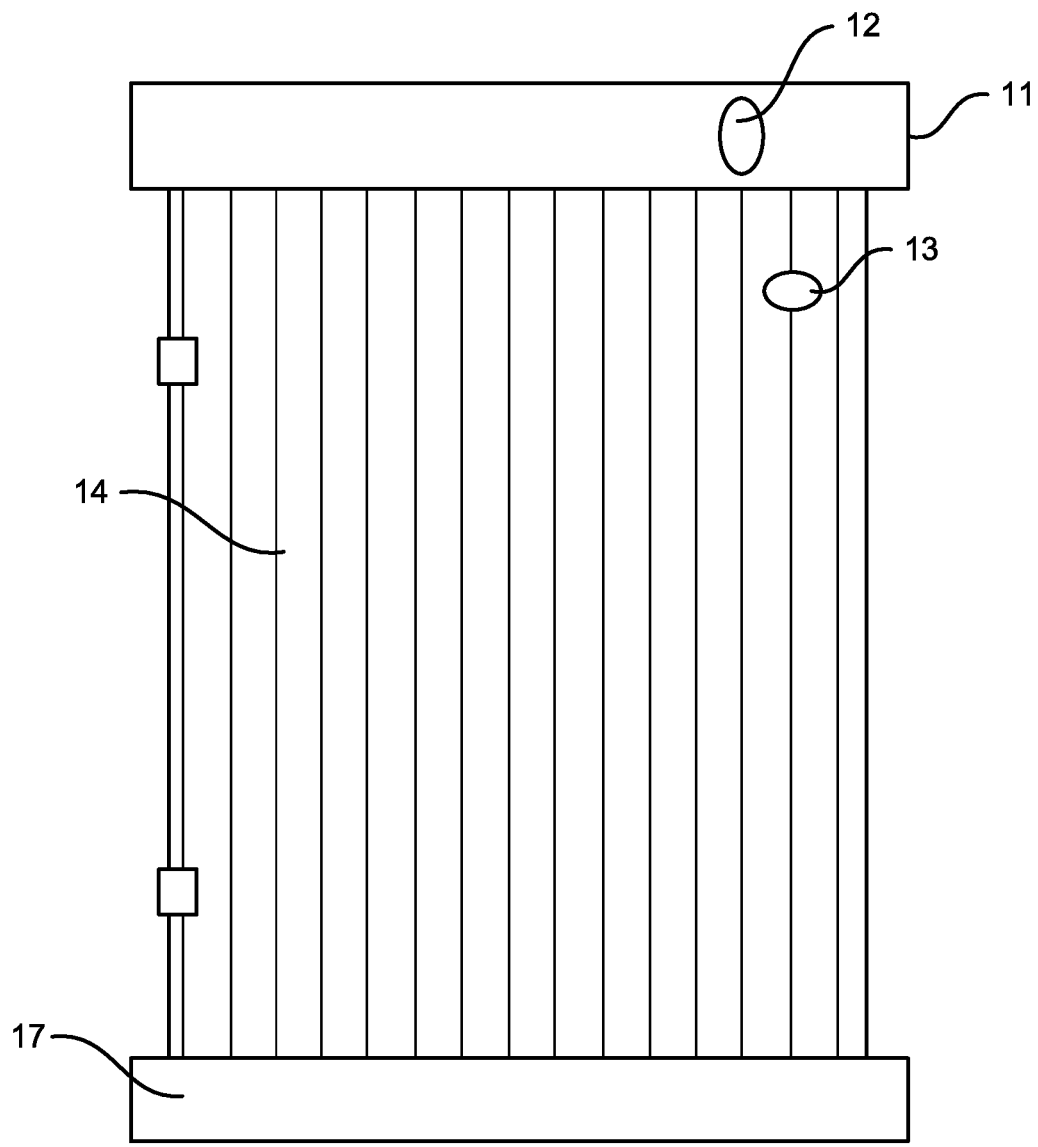
FIG. 1 shows an exemplary view of a stain proof gardening container with the front panel member in a closed position according to an embodiment of the present disclosure.

Exemplary embodiments disclosed herein describe a stain-proof gardening container. The container includes a cap brace including a plurality of grooves, each groove for receiving a top edge from one of a corresponding vertically oriented left side panel member, right side panel member and back panel member; a front panel member including a handle, the front panel member is fixedly attached to the left side panel member, and the handle allows the movement of the front panel member to an open or closed position; a floor panel including a well and a plurality of grooves, each groove for receiving a bottom edge from one of a corresponding vertically oriented left side panel member, right side panel member and back panel member; a housing frame, wherein the housing frame is formed by the cap brace, left side panel member, right side panel member, back panel member, front panel member and floor panel, the housing frame including an interior cavity; a gardening collection receptacle for receiving and storing at least one gardening component, the gardening collection receptacle including an elastic headband located at a top region of the gardening collection receptacle for installing the gardening collection receptacle in the interior cavity of the housing unit and a drainage aperture located at a bottom region of the gardening collection receptacle for draining excess materials from the gardening collection receptacle; and a drainage collection repository for receiving the excess materials drained from the gardening collection receptacle, the drainage collection repository including a handle for removing the drainage collection repository from the housing unit, and wherein the drainage collection repository is positioned within the well in the floor panel.

In some exemplary embodiments, the excess materials drained from the gardening collection receptacle includes water.

In some exemplary embodiments, the elastic headband attaches to the housing unit between each groove in the cap brace and each groove's received top edge from one of a corresponding vertically oriented left side panel member, right side panel member and back panel member.

In some exemplary embodiments, the cap brace includes an aperture for receiving therethrough the at least one gardening component.

In some exemplary embodiments, the cap brace includes an indicator light for notification of time to empty the drainage collection repository.

In some exemplary embodiments, the housing unit includes a battery operated switching arm with an attached floating member.

In some exemplary embodiments, the attached floating member is positioned inside the drainage collection repository.

In some exemplary embodiments, the floating member responds to water depth changes in the drainage collection repository.

In some exemplary embodiments, the switching arm activates the indicator light in the cap brace when the floating member rises to a pre-set point within the drainage collection repository.

In some exemplary embodiments, the front panel member provides a user access to the interior cavity of the housing unit.

In some exemplary embodiments, the gardening component includes at least one or more from the group consisting of a plant, potting soil, and water.

In some exemplary embodiments, the drainage aperture is located at the center of the bottom of the gardening collection receptacle.

In some exemplary embodiments, the positioning of the drainage collection repository is aligned with the drainage aperture.

In some exemplary embodiments, the gardening collection receptacle is a construction strength plastic bag.

In some exemplary embodiments, the plastic bag is transparent.

In some exemplary embodiments, the transparent plastic bag allows a user to determine upon visual inspection whether a plant needs to be replanted.

In some exemplary embodiments, the container includes one or more wheels for moving the container.

DETAILED DESCRIPTION

Figure 2:
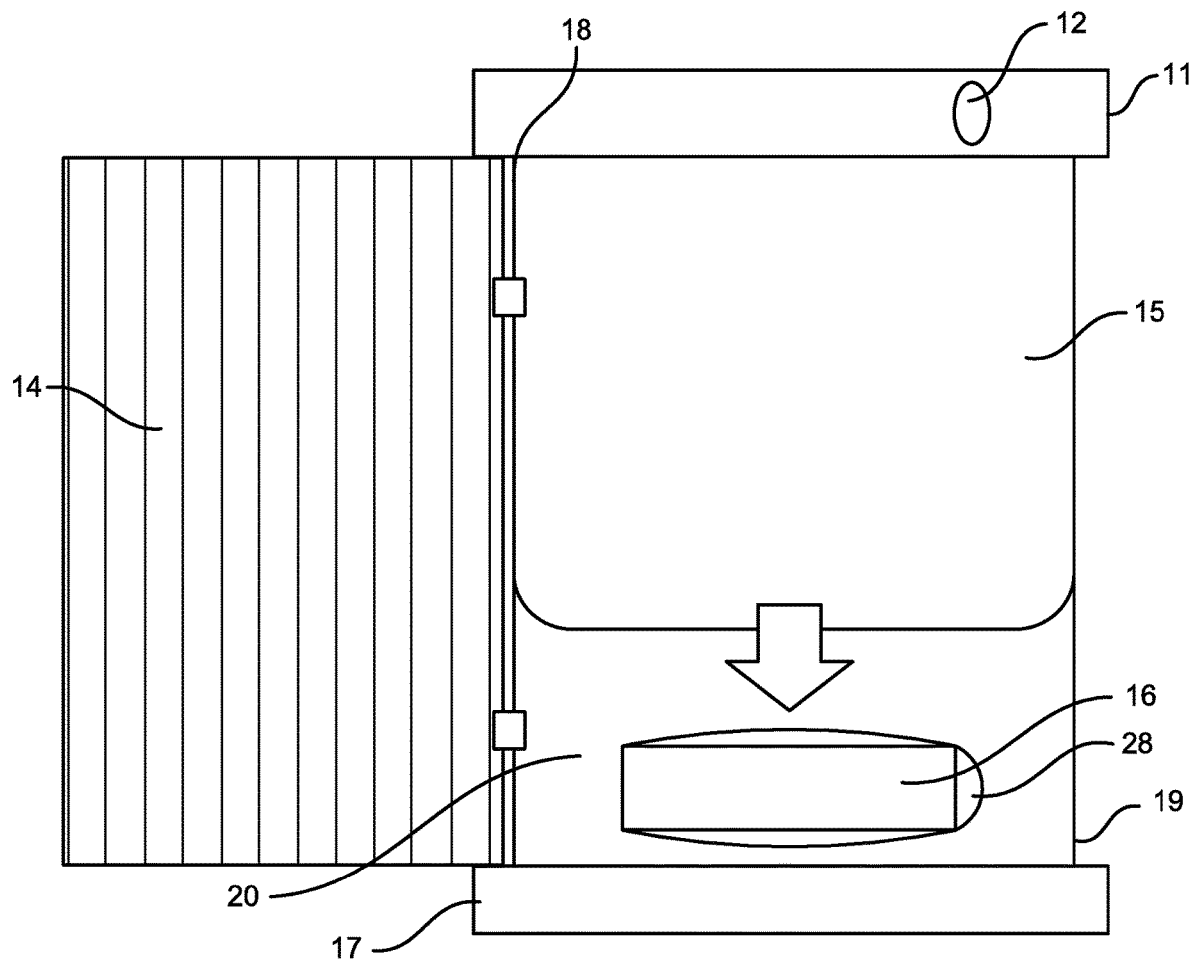
FIG. 2 shows an exemplary view of a stain proof gardening container with the front panel member in an open position according to an embodiment of the present disclosure.

The present disclosure relates to a stain proof gardening container. As illustrated in FIGS. 1-2, the stain proof gardening container 10 includes a cap brace 11, a left side panel member 18, a right side panel member 19, a back side panel member 20, a front panel member 14, a floor panel 17, a gardening collection receptacle 15, and a drainage collection repository 16. All panel members (i.e., left side 18, right side 19, back side 20 and front 14) are vertically oriented. The cap brace 11 and floor panel 17 are horizontally oriented. A squarish shaped housing frame is formed from the connection of cap brace 11, a left side panel member 18, a right side panel member 19, a back side panel member 20, a front panel member 14, a floor panel 17. The housing frame includes an interior cavity.

The housing frame includes a battery operated switching arm with an attached floating member (not shown). The attached floating member is positioned inside the drainage collection repository 16 and responds to water depth changes in the drainage collection repository. The switching arm activates the indicator light 12 in the cap brace 11 when the floating member rises to a pre-set point within the drainage collection repository 16.

Figure 3:
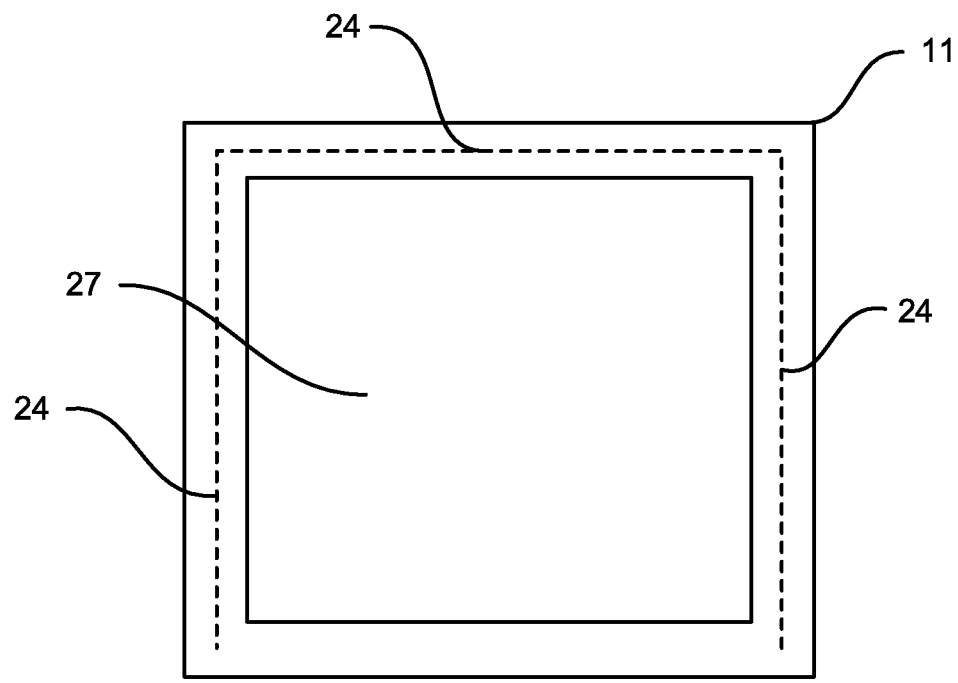
FIG. 3 shows an exemplary view of a cap brace according to an embodiment of the present disclosure.

As illustrated in FIG. 3, cap brace 11 is square shaped and includes a plurality of internal Dado cut grooves 24 (i.e., left groove, right groove, and back groove), each one for receiving a corresponding one of the left side panel member 18, right side panel member 19, and back side panel member 20. Each groove receives the top edge of the corresponding one of the panel members.

The cap brace 11 includes an indicator light 12 on its front side. The indicator light alerts the user that the drainage collection repository needs to be emptied. The cap brace includes an aperture 27 for allowing one or more gardening components to pass therethrough. The cap brace may be made from any suitable material, such as, for example, plastic. The cap brace may be made in a variety of sizes.

The left side panel member 18, right side panel member 19, back side panel member 20 and front panel member 14 each have a top edge and a bottom edge and each may be made of any suitable material and in a variety of sizes.

The front panel member 14 includes a handle 13 for moving the front panel member to an open position or a closed position. The front panel member 14 is fixedly attached to the left side panel member 18 such that the front panel member is able to open and close. The front panel member is frictionally attached to the right side member 19 when the front panel member is in a closed position. The front panel member may be attached to the left side panel member by any suitable mechanism, such as, for example, a fastener. The front panel member provides a user with access to the interior cavity of the housing unit.

Figure 5:
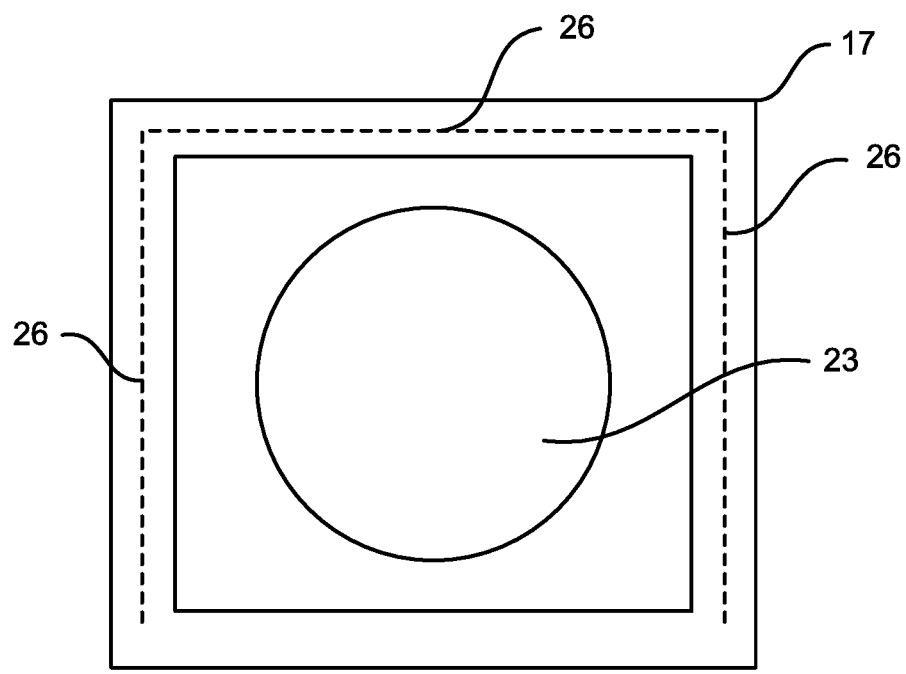
FIG. 5 shows an exemplary view of a floor panel according to an embodiment of the present disclosure.

As illustrated in FIG. 5, floor panel 17 is square shaped and includes a plurality of internal Dado cut grooves 26 (i.e., left groove, right groove, and back groove), each one for receiving a corresponding one of the left side panel member 18, right side panel member 19, and back side panel member 20. Each groove receives the bottom edge of the corresponding one of the panel members. The floor panel includes a well 23 for receiving drainage collection repository 16. The floor panel may be made from any suitable material, such as, for example, plastic. The floor panel may be made in a variety of sizes.

Figure 4:
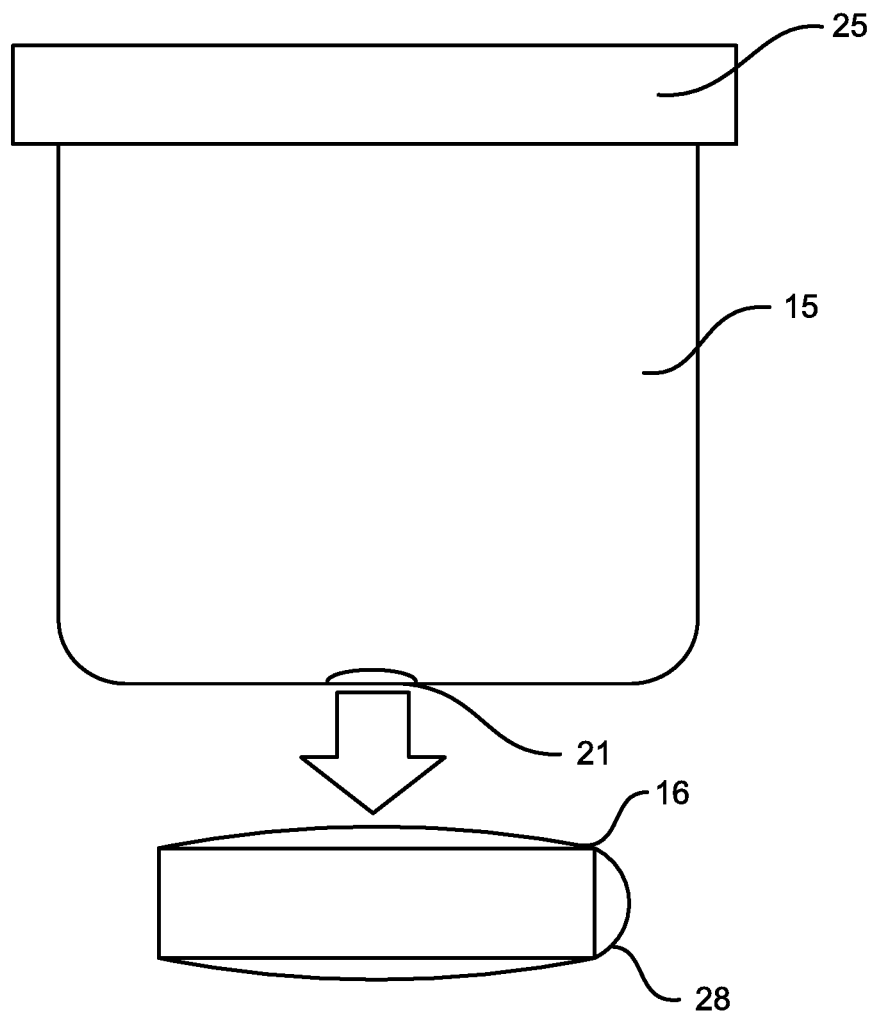
FIG. 4 shows an exemplary view of a gardening collection receptacle and drainage collection repository according to an embodiment of the present disclosure.

The gardening collection receptacle 15 receives and stores at least one gardening component, such as, for example, a plant, potting soil or water. As illustrated in FIG. 4, the gardening receptacle 15 includes an elastic headband 25 located at a top region of the gardening collection receptacle 15. The elastic headband allows the gardening collection receptacle to be installed in the interior cavity of the housing unit, as shown in FIG. 2. The elastic headband attaches to the housing unit between each groove in the cap brace 11 and each groove's received top edge from one of a corresponding vertically oriented left side panel member 18, right side panel member 19 and a back side member 20.

The garden collection receptacle 15 includes a drainage aperture 21 located at the center of a bottom region of the gardening collection receptacle for draining excess materials, such as, water, for example, from the gardening collection receptacle. The garden collection receptacle may be made of any suitable material. In a preferred embodiment, the garden collection receptacle is a transparent construction strength plastic bag. The transparency of the bag allows a user to determine upon visual inspection whether a plant needs to be replanted. In the event that the plant needs to be replanted, the plant can be released simply by pushing up on the bottom of the plastic bag.

The drainage collection repository 16 receives the excess materials drained from the gardening collection receptacle 15. The drainage collection repository is located in the well 23 of the floor panel 17 and the positioning of the drainage collection repository is aligned with the drainage aperture 21 in the garden collection receptacle.

The drainage collection repository 16 includes a handle 28 for removing the drainage collection repository from the housing unit. The drainage collection repository can be a bowl and may be made of any suitable materials, such as, for example, glass or plastic. The drainage collection repository may be made in a variety of sizes.

In another exemplary embodiment, the stain proof gardening container 10 includes wheels for easy movement of the container.

In another exemplary embodiment, the stain proof gardening container 10 includes a mesh screen attached to the top of cap brace 11. The mesh screen may be located between the side panels and their corresponding grooves in the cap brace 11, directly above elastic headband 25. In this embodiment, the stain proof gardening container 10 is converted into a stand for use with a gardening component that rests inside another container. The gardening component and the container would sit on top of the mesh screen.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.)

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A stain-proof gardening container comprising:
a cap brace including a plurality of grooves, each groove for receiving a top edge of a corresponding one of vertically oriented left side panel member, right side panel member and back panel member;
a front panel member including a handle, the front panel member is fixedly attached to the left side panel member, and the handle allows the movement of the front panel member to an open or closed position;
a floor panel including a well and a plurality of grooves, each groove for receiving a bottom edge from one of a corresponding vertically oriented left side panel member, right side panel member and back panel member;
a housing frame, wherein the housing frame is formed by the cap brace, left side panel member, right side panel member, back panel member, front panel member and floor panel, the housing frame including an interior cavity;
a gardening collection receptacle for receiving and storing at least one gardening component, the gardening collection receptacle including an elastic headband located at a top region of the gardening collection receptacle for installing the gardening collection receptacle in the interior cavity of the housing frame unit and a drainage aperture located at a bottom region of the gardening collection receptacle for draining excess materials from the gardening collection receptacle; and
a drainage collection repository for receiving the excess materials drained from the gardening collection receptacle, the drainage collection repository including a handle for removing the drainage collection repository from the housing unit, and wherein the drainage collection repository is positioned within the well in the floor panel.

2. The container of claim 1, wherein the excess materials drained from the gardening collection receptacle includes water.

3. The container of claim 1, wherein the elastic headband attaches to the housing unit between each groove in the cap brace and each groove's received top edge from one of a corresponding vertically oriented left side panel member, right side panel member and back panel member.

4. The container of claim 1, wherein the cap brace includes an aperture for receiving therethrough the at least one gardening component.

5. The container of claim 1, wherein the cap brace includes an indicator light for notification of time to empty the drainage collection repository.

6. The container of claim 1, wherein the front panel member provides a user access to the interior cavity of the housing unit.

7. The container of claim 1, wherein the drainage aperture is located at the center of the bottom of the gardening collection receptacle.

8. The container of claim 1, wherein the positioning of the drainage collection repository is aligned with the drainage aperture.

9. The container of claim 1, wherein the gardening collection receptacle is a construction strength plastic bag.

10. The container of claim 9, wherein the plastic bag is transparent.

* * * * *